J. J. KELLEHER.
AUTOMOBILE JACK.
APPLICATION FILED FEB. 7, 1914.

1,129,494.

Patented Feb. 23, 1915.

WITNESSES:
Pearl Stanton

INVENTOR,
J. J. Kelleher,
by G. C. Kennedy
ATTORNEY

UNITED STATES PATENT OFFICE.

JOSEPH J. KELLEHER, OF WATERLOO, IOWA.

AUTOMOBILE-JACK.

1,129,494. Specification of Letters Patent. Patented Feb. 23, 1915.

Application filed February 7, 1914. Serial No. 817,207.

*To all whom it may concern:*

Be it known that I, JOSEPH J. KELLEHER, a citizen of the United States of America, and a resident of Waterloo, Blackhawk county, Iowa, have invented certain new and useful Improvements in Automobile-Jacks, of which the following is a specification.

Figure 1:
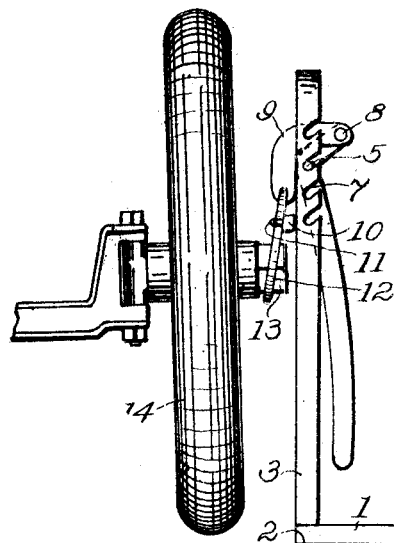
Figure 2:
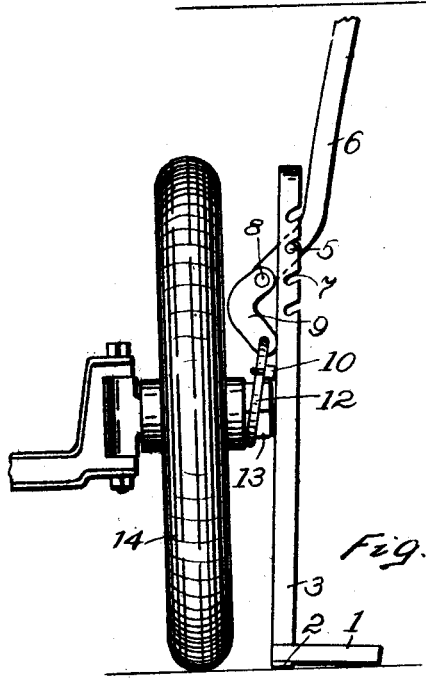
Figure 3:
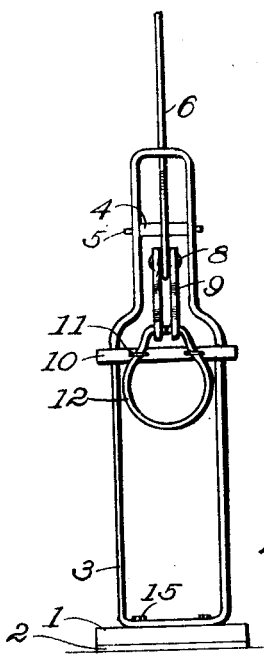

My invention relates to improvements in automobile-jacks, and the object of my improvement is to furnish for garages or the like, simple, easily operated jacks for lifting the pneumatic tires out of contact with the usual supporting surface, and holding them in a raised position to prevent damage to the tires by the compressing strain exercised upon their parts which sustain the load of the vehicle. This object I have accomplished by the means which are hereinafter described and claimed, and which are illustrated in the accompanying drawings, in which:

Figure 1 is a side elevation of my improved jack in its first position, that of being located to engage one of the hubs of an automobile preliminary to lifting the same. Fig. 2 is a side elevation of my said jack in its second position, showing the parts moved to lift the hub and wheel of the automobile, parts of the jack being locked in their position for holding said hub and wheel elevated from the supporting surface. Fig. 3 is a rear elevation of said jack, showing the parts in their positions, as shown in said Fig. 1.

Similar numerals of reference denote corresponding parts throughout the several views.

My improved jack comprises a foot or base-block 1, and a transverse bar 2 is secured along one edge of its under face, to give the block 1 a suitable inclination relative to the supporting surface.

The numeral 3 denotes a substantial rectangular upright frame, having two spaced vertical standards, whose different parts are brought closer together and integrally connected at the top. The lower part of said standards are integrally connected by a cross-bar, and said cross-bar is secured across one end of the upper face of the block 1, immediately over the bar 2 by means of the bolts 15. Since the block 1 has an inclination away from the horizontal, due to the underlying bar 2, the standards of the frame 3 are similarly inclined from the vertical, which, when the jack is placed in the proper position adjacent to an automobile wheel 14, as shown in Fig. 1, tilts it away from said wheel at the top. The upper, more narrowly spaced parts of said standards have alined inclined notches 7 on their outer faces. These notches are adapted to seat the pintles 5 adjustably on a short rock shaft 4 seated between said standards and upon which the hand-lever 6 is fixed. A pair of parallel depending like angular links are pivotally connected to the pintles 8 at the extremity of the short end of said lever 6.

The numeral 12 denotes a strong metal loop, whose inturned meeting upper ends are pivotally seated in alined orifices in the lower ends of said pair of links 9. A cross-bar 10 is secured across the outer face of the loop 12 somewhat below the lower ends of said links by means of the staples 11. The bar 10 is seated between said loop and the standards 3, and projects somewhat beyond the latter.

The hand-lever 6 is bent at an obtuse angle at the location of its pintles 4—5, for a purpose to be hereinafter described.

The numeral 14 denotes the pneumatic tire of an automobile wheel, having a hub projection 13 on its outer face, about which the loop 12 is adapted to be seated when the parts of the jack are in the positions shown in said Fig. 1, where the hand-lever 6 is elevated to its full extent to lower the angle links 9, together with said loop sufficiently. The cross-bar 10 serves to keep said loop 12 spaced away a sufficient distance from the standards 3, so that the hub 13 and wheel may not interfere therewith, and the bar 10 moved upwardly with said link, serves as a slide-bar over said standards 3, keeping the link in its proper lifting position at all times. When the link 12 is thus fitted over the hub 13, the wheel may be elevated to the position shown in said Fig. 2, by swinging down the hand-lever 6 to the position indicated, in which position the jack may be lifted, its parts being locked together. This locking arrangement is due to the peculiar forms and relations of the said lever 6 and the angular links 9 relative to the positions of the pintles 5 and 8 and the load carried by said loop 12. When the lever 6 is depressed to its lowermost position, the pintles 8 are moved over to the right, beyond their dead center relative to the pintles 5 and the pivotal connections of the loop 12 with the lower ends of the angular links 9. The like angular forms of said hand-lever and said links permits of this locking arrangement, and when the parts are so arranged, the load of the vehicle has no effect in displacing them.

The outwardly inclined position of the standards 3 gives stability to the jack as against the weight of the load, tending to pull it over toward the wheel 14. To lower the wheel 14, it is merely necessary to elevate the lever 6 to the position indicated in said Fig. 1, when the loop 12 may be readily removed from the hub 13. The plurality of notches 7 provided in said standards 3, permit of the pintles 5 of the lever 6 being adjustably seated in either alined pair of said notches to allow the jack to be used with wheels 14 of different diameters.

Having described my invention, what I claim as new, and desire to secure by Letters Patent, is:

An automobile jack, comprising an upright supporting body formed of a spaced pair of rigidly-connected uprights provided with a plurality of horizontally-alined inclined notches on one edge of each, a hand-lever having pintles adjustably seated in certain opposite ones of said notches, said lever being bent at said pintles, a pair of like angular links suspended from the short end of said lever to override the angle of the lever and also its pintles, and a loop suspended from the depending ends of said links, the pivots of said links to said lever being adapted to pass the dead center about the lever pintles when the lever is depressed to its lowermost limit and a spacing-bar secured across the said loop between it and said uprights.

Signed at Waterloo, Iowa, this 21st day of Jan., 1914.

JOSEPH J. KELLEHER.

Witnesses:
W. H. BRUNN,
GEO. C. KENEDY.